Aug. 2, 1966 R. R. KNITTEL ET AL 3,263,247
HEADED HOLLOW BODY SUPPORT
Filed March 3, 1964 2 Sheets-Sheet 1

INVENTORS
RONALD H. BECKMAN
CHARLES H. BURNETTE
BY RICHARD R. KNITTEL

ATTORNEYS

Aug. 2, 1966  R. R. KNITTEL ETAL  3,263,247
HEADED HOLLOW BODY SUPPORT
Filed March 3, 1964  2 Sheets-Sheet 2

INVENTORS
RONALD H. BECKMAN
CHARLES H. BURNETTE
BY RICHARD R. KNITTEL

ATTORNEYS

United States Patent Office 3,263,247
Patented August 2, 1966

3,263,247
HEADED HOLLOW BODY SUPPORT
Richard R. Knittel, Box 855, R.R. 1, Martinsville, N.J.;
Charles H. Burnette, 1219 Panama St., Philadelphia,
Pa.; and Ronald H. Beckman, 27 Bank St., New York,
N.Y.
Filed Mar. 3, 1964, Ser. No. 348,993
5 Claims. (Cl. 5—353)

This invention relates to a resilient load supporting assembly, and more particularly to a vented, bellows spring cushioning assembly, especially for furniture, mattresses, cushions, automotive and general transportation seating.

The advantageous features resulting from the employment of a plurality of resilient, vented bellows springs to form load supports, useful for example in furniture, automotive seating, mattresses, throw cushions, and others, are many as set forth in patent application, Serial No. 256,376, entitled, Molded Body Support, filed February 5, 1963, and patent application Serial No. 348,934, entitled, Molded Spring, filed, March 3, 1964. Many times intermeshing of the bellows of adjacent springs is greatly desired due to the unique effects which result, as set forth in the latter patent application.

Whether or not the springs are intermeshed, spacing of the respective springs with respect to each other, and positioning of a plurality of springs in a proper pattern, is often difficult to achieve. The amount of spacing between individual bellows of the adjacent springs is normally not readily visible to the assembler to enable him to conveniently locate the spring. Even after the springs are located, it is very difficult to secure them in this exact position without movement.

After the springs are assembled, lateral shifting of one or more springs is also potentially possible, especially if hard usage occurs. The means normally relied upon in efforts to prevent this shifting is the securement of each spring to a common support as by staples, adhesives, fusion or the like. Only if the bellows of adjacent springs are substantially interengaged is there any mutual cooperation between the springs themselves to limit lateral shifting. Even then, exact initial positioning is difficult to obtain.

Spring assembly stability and effectiveness is not only affected by lateral shifting of one or more springs, but also by the potential cocking of one spring on another, especially if one is tilted sufficiently to have a bellows edge catch beneath a bellows of an adjacent spring. This not only detracts significantly from the appearance of an article employing the springs by creating a dip or bump in the surface, but also causes an unpleasant feeling to the person using the article as a support.

Another disadvantageous factor possible with bellows spring load supporting assemblies results from the gap occurring between the heads of adjacent springs, even if the springs are intermeshed. The usual circular or ovular spring configuration leaves substantial gaps between the adjacent heads of the springs. If the springs are placed closely adjacent, the bellows become interengaged, rather than moving adjacent each other with independence. To cover these gaps, substantially thick surface cover pads of soft sponge material are employed over the upper ends of the springs. Without this pad, the outline of each spring would be telegraphed through the cover sheet to present an uneven surface.

It is therefore an object of this invention to provide a novel bellows spring and spring assembly causing mutual cooperation between the springs to effect interstability when assembled, maintaining the springs aligned and preventing cocking of the springs on one another. The novel construction enables springs to be placed closely adjacent and in contact with each other without requiring interengagement of the bellows. The springs prevent lateral shifting of adjacent springs. Each spring is prevented from cocking with a unique, cooperative supporting and sliding action between adjacent springs.

It is another object of this invention to provide a novel bellows spring and spring assembly enabling exact spacing and positioning of the individual springs with respect to each other, allowing the assembler to visibly ascertain the exact spacing between the springs merely by a glance at the top of the adjacent springs.

It is another object of this invention to provide a novel bellows spring and spring assembly that prevents the substantial gap heretofore occurring between the upper ends of the adjacent springs, thereby providing a generally uniform and comfortable surface, and a more attractive surface when covered, since no gaps exist to be telegraphed through the cover sheet.

These and several other objects of this invention will be apparent upon studying the following specification in conjunction with the drawings in which.

Figure 1:
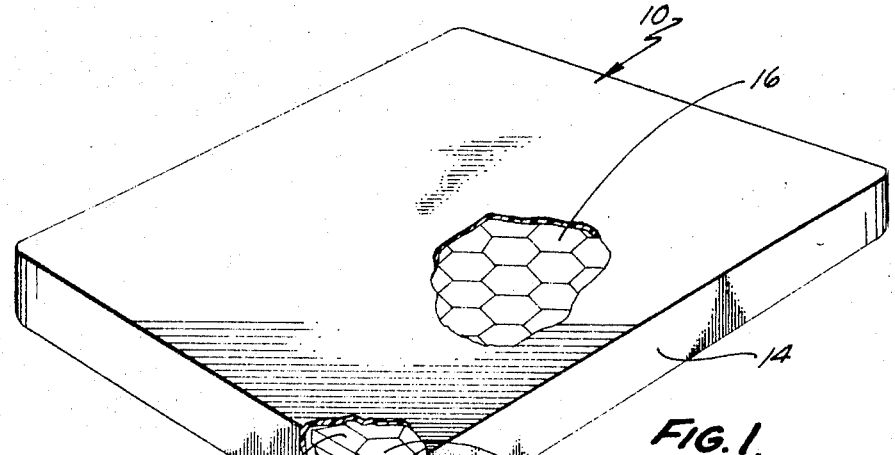
FIG. 1 is a perspective view of a load supporting assembly employing one form of the novel bellows spring.

Referring specifically to the drawings, the first form of the novel spring illustrated is employed with a plurality of like springs in a cooperative load supporting assembly 10. This assembly includes a suitable support 12 such as a panel, an enveloping cover 14 extending over the top and the peripheral edge of the assembly and wrapped around a portion of panel 12, and a plurality of the novel springs 16 supported on the upper surface of the support.

Each of the bellows springs comprises a hollow, undulated element having a peripheral wall formed of a series of adjacent, integrally interconnected, individual bellows of a resilient polymer. This polymer may be of any suitable material capable of being repeatedly flexed under compressive load and of returning to its original biased expanded state without significant permanent set. Suitable materials include polyethylene, especially low-density polyethylene, or an olefin such as polypropylene, or other suitable materials such as a polymer of ethylacrylate mixtures, or possibly a propylene butadiene polymer or similar materials.

Each spring may be formed by methods such as blow-molding or rotational casting, according to known techniques.

Each individual bellows 18 comprises a pair of annular outwardly converging legs having an arcuate outer juncture forming an integral hinge. The inner junctures of adjacent bellows are integrally interconnected. The stack of bellows defines a hollow internal chamber 20 which is purposely freely vented to the atmosphere through suitable vents 22 or 24 to cause the entire resilient support of the spring to be imparted by the wall characteristics rather than by pneumatic effects. In fact, pneumatic hindrance is purposely eliminated by using the vents, which enable the atmospheric air to freely move between the interior and the exterior of each spring.

Since the wall characteristics control the compression characteristics of each spring, the spring action may be varied by varying the wall thickness, the angle of separation of the legs of each bellows, the characteristics of the hinge, and/or the characteristics of the polymeric material from which the spring is formed and the variation in thickness over the wall.

Figure 6:
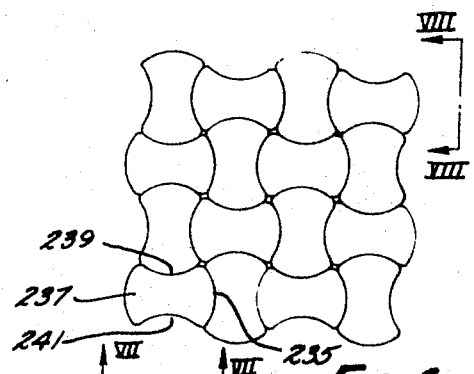
FIG. 6 is a plan view of an assembly of a third form of novel springs.
Figures 7, 8:
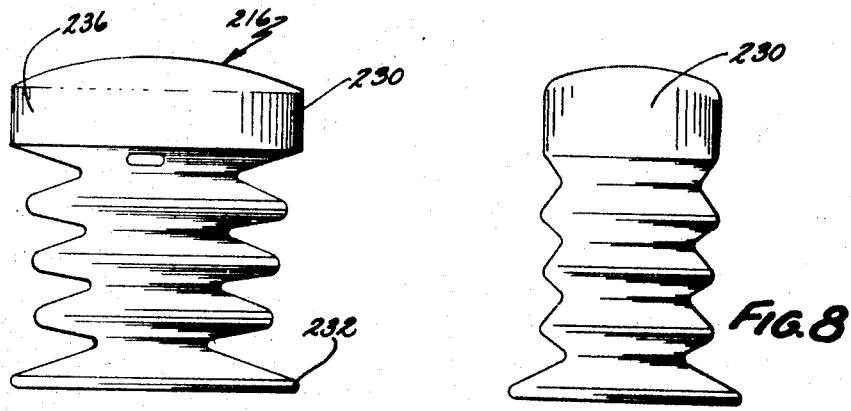
FIG. 7 is a side elevational view of one of the springs illustrated in FIG. 6, taken on plane VII—VII.
FIG. 8 is a side elevational view of the second side of the novel spring illustrated in FIG. 6 taken on plane VIII—VIII.

On at least one end of the spring, and preferably on both ends, is a head 30, usually enlarged and formed integrally with the remainder of the bellows spring. The cross-sectional configuration of the head of each spring is compatible with and complementary to the heads of the adjacent springs, to form a relatively continuous surface. The upper surface of each head may be slightly convex if desired, or substantially flat and planar. Each of these heads may extend radially beyond the bellows to limit the contact between adjacent springs to controlled amounts. The cross-sectional configuration is polygonal with three or more sides. In some instances, it is preferable to have these sides planar as in FIGS. 1–5. In other instances, it is preferable to have these sides concaved and convexed slightly to interfit cooperatively as in FIGS. 6–8. The head and base 32 of each spring is hollow with the internal chamber communicating commonly with the hollow chamber 20 inside the central portion of the spring. The head, and also the base when employed, includes a peripheral lateral surface 36 substantially parallel to the axis 38 of the spring to form limited and sliding contact with adjacent springs. When the springs are placed in a pattern adjacent each other, vertical sliding contact in the direction of the axis of the springs can take place between these peripheral abutment surface areas of the heads. This contact can be used to prevent interengagement between the bellows of the springs when desired. At any rate, the resilient characteristics of any zone of an assembly can be controlled according to previously made calculations. If the springs are not intermeshed, the cooperative contacting peripheral surfaces prevent tilting or cocking of one spring upon another when compressed.

The cooperative abutment between springs also desirably forms a generally continuous upper surface, relatively free of large gaps between adjacent springs, to increase the comfort to a user resting thereon, and to present a more attractive over-all appearance when covered by a cover layer. The gaps and outlines of the springs are not telegraphed to the surface in a sharply defined pattern. Also, the overlying padding need not be as thick as when gaps occur, to provide the same comfort-lending conditions.

The enlargement forming the head or base (each of which can be called a "head") is ordinarily symmetrical about the axis of the spring.

The particular diameters of the heads or enlargements may be varied in some instances, as well as the symmetry with respect to the axis to achieve desired spring spacings while still allowing the heads to be placed into abutment or near abutment. This creates a generally continuous upper surface, but also greatly simplifies the assembly job while effecting accurate, controlled, and zonally varied spacing.

On the edge of the assembled article, the heads may include unsymmetrical configurations like that illustrated at 16A in FIG. 1, to cause adjacent heads to provide a continuous lateral edge rather than an edge having a series of adjacent gaps.

Each of the springs 16 and 16' or selected ones thereof may be secured to panel 12, or its equivalent, by any suitable means such as heat fusion, adhesion with added adhesives, stapling, tie elements or other equivalents.

The height of each individual enlargement or head will be varied to suit the circumstances. Therefore, if a spring has only slight compressibility, the height of the head need not be as great to accomplish its purpose and cause the peripheral sliding edges to remain in contact, as when the spring has large compressibility. Also, if the springs in a group are intermeshed to be compressed simultaneously, the height of the head need not be as great as when each spring or a plurality of springs act relatively independently.

When the springs are formed by a blow-molding process, the outer junctures are normally of smaller wall thickness than the inner junctures and the remainder of the bellows legs, since the thickness of the blown article varies inversely with the distance of the portion of the article away from the central axis upon which the heated parison is blown. This variation in wall thickness causing greatest flexibility in the outer junctures is normally desirable. Also, it is usually desirable to have arcuate outer junctures because of the improved resilience supplied thereby, and the flexure over the complete arcuate portion of the hinge. In fact, when employing thin outer arcuate hinges, almost the entire deflection of each spring is the result of the flexure of the several outer juncture hinges, with only slight flexing occurring in the legs and at the inner junctures during spring compression under load.

Figure 2:
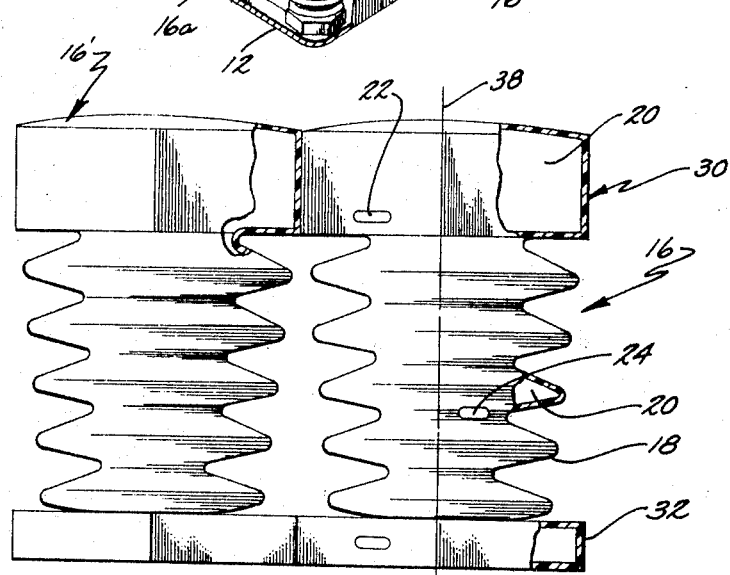
FIG. 2 is a side elevational enlarged view of two of the adjacent springs in the assembly of FIG. 1.
Figure 3:
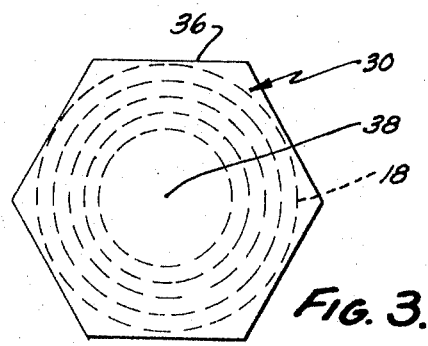
FIG. 3 is a plan view of one of the springs illustrated in FIG. 2.

Instead of the non-intermeshed type bellows spring illustrated in FIGS. 1, 2 or 3, it is almost always preferable to intermesh adjacent bellows springs as explained specifically in the above identified patent application Serial No. 348,934 entitled Molded Spring, filed March 3, 1964. When bellows springs are intermeshed, it has been found that a multiple reaction takes place involving several springs upon the application of the load to one or more of the springs. When an axial force is applied to the springs, the force is transmitted laterally between the springs. The legs of each bellows are pressed against the abutting legs of the internested bellows of adjacent springs. The individual bellows are forced to expand radially outwardly into the space 40 left in the groove into which each bellows springs fits. If the bellows springs are intermeshed so much as to eliminate the space, very little if any compression can occur. In fact, the spring characteristics in a particular zone are highly dependent upon the degree of interfit of the bellows, with fractions of an inch difference in position, causing significant differences in resilience of a zone. Exact location of springs is uniquely achieved with the novel springs, with control fractions of an inch being entirely possible.

When the bellows are to be intermeshed, preferably the individual springs have a generally tapered construction which may vary from one end to another. Thus, the illustrative springs 116 and 116' illustrated in FIG. 4, each have a taper from one end to the other, and are intermeshed by inverting one of the springs. Tapering not only facilitates intermeshing, but also has other advantageous results. When the spring is blow-molded, the tapered construction causes the outer junctures to have decreasing wall thicknesses from the small diameter bellows to the larger diameter bellows. Consequently, these act sequentially when compressed under axial loads. Likewise, the inner junctures have varying wall thickness from the small diameter to the large diameter in accordance with the principles set forth hereinabove. Thus, generally speaking, they act sequentially after the outer diameters have acted. Further, the relatively thick plastic in the inner junctures of adjacent hinges do not tend to pile up when the tapered spring is compressed to unduly limit compression, as contrasted to a generally cylindrical columnar spring.

When intermeshed springs are compressed under load, the individual bellows directly under the load are axially compressed and expand radially into the grooves between the two straddling bellows of the adjacent spring. The frictional force between the legs is supplemented by the cumulative resistance of the individual bellows to compression, and the interference fitting effects resulting from the necessity of radial expansion of each bellows and the increased resistance thereto with the closing of the angle of the grooves and of the bellows. The adjacent springs have a variation in compression over their width resembling a "toggle joint" action. A multiple effect results.

Load distribution is also normally aided by cover sheet 14, which is flexible but not normally stretchable. In some instances, the sheet may be wrapped around the assembly so that the rigid or semi-rigid panel 12 is not necessary when proper securement is used between the springs and the enveloping sheet.

Figure 4:
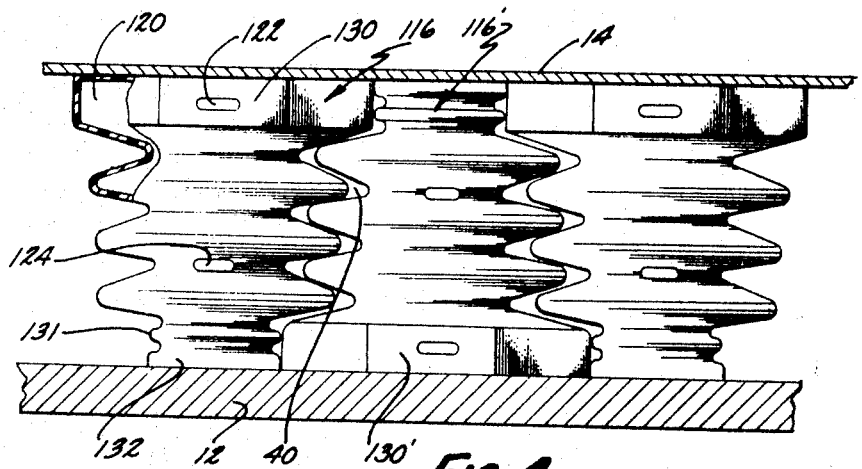
FIG. 4 is a side elevational view of an assembly employing a second form of the novel spring.
Figure 5:
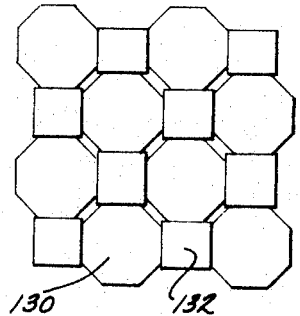
FIG. 5 is a plan view of the spring assembly in FIG. 4.

With the type of spring illustrated in FIG. 4, one end 130 is a radial enlargement extending beyond the outer junctures of the individual bellows and having a generally polygonal cross-sectional configuration to form a peripheral contacting surface area, parallel to the spring axis. The outer end 132 is actually smaller in diameter than the bellows, and is polygonal in cross-sectional configuration to complement and interfit with the adjacent enlargement 130' of the adjacent spring 116' turned end for end. This smaller end 132 may be square in cross-sectional configuration to interfit with the hexagonal enlargements 130 of surrounding springs. Together they form a generally continuous upper surface with no substantial gaps (see FIG. 5). Other complementary polygonal cross-sectional configurations may also be employed as alternatives. The peripheral abutting surfaces on these are pre-calculated to control the interfit to produce a predetermined resilience when assembled.

The interior of each of these hollow springs is a chamber 120 vented to the atmosphere for free exchange of air in and out of the spring through suitable vents 122 and/ or 124. If desired, the small end 132 of each spring may include protruding flexible folds 131 to provide some degree of flexibility to this end.

It will readily be ascertained that each of the two forms of the invention already described achieves surface continuity and controlled engagement between and positioning of springs. Spacing of individual springs with respect to each other is readily achieved by an unskilled assembler by placing the springs side by side while visually observing and abutting the edge surfaces of the adjacent spring heads. With enlargements or heads of differing diameters, these may be placed in direct abutting peripheral contact to form adjacent vertically sliding surfaces, or may be slightly spaced to allow each spring to tilt to a controlled degree before abutting the adjacent peripheral bumper surface. The person assembling the unit need only attach color coded or number coded springs in abutment or near abutment, according to a plan.

In the third illustrated form of the invention (FIGS. 6, 7 and 8), a different configuration is shown in which the peripheral surface 236 on the springs 216 has side edges that are slightly curved, with two opposite sides being convex and the other two being concave. The curve is preferably "dog-bone" shaped. Each elongated, "dog-bone" shaped enlargement 230, therefore, includes a pair of opposite generally convex lobes 235 and 237 on the ends, spaced by a pair of opposite concave depressions 239 and 241, all symmetrical about the spring axis. The lobes of one spring interfit with the depressions of a pair of adjacent springs as illustrated in the plan view in FIG. 6. Thus, the entire assembly forms a generally continuous surface with no large gaps. The peripheral abutment surfaces may be placed into abutting contact originally or may be slightly spaced as is necessary.

Each of the these springs is hollow and vented to the atmosphere. It includes a base which may be slightly or generally enlarged as at 232. The upper surface of each spring may be slightly convex in configuration, especially if a generally tufted surface characteristic is desired.

The specific forms of the invention illustrated and described are believed to clearly set forth the principles and unique concepts providing the advantages indicated, as well as other advantages obvious to those skilled in the art. It will be readily apparent that a great number of particular configurations achieving the interfitting characteristics, continuity, mutual interaction and limited controlled contact between springs can be quickly envisioned by anyone in the art. Since a complete array of alternative configurations would be superfluous, would add nothing significant to the disclosure, and would be obvious equivalents of the forms depicted, such an array is not presented herein. The invention is not to be limited merely to the illustrated forms presented, but only by the scope of the appended claims and the reasonably equivalent structures to those defined therein.

We claim:

1. A load supporting, bellows spring comprising: a hollow body formed of a plurality of integrally interconnected individual bellows forming a resilient support; each of said bellows having a resilient hinge at its outer peripheral extremity to collectively provide support to said body; the interior of said body being vented to the atmosphere to prevent significant pneumatic interference; one end of said spring having an enlarged head extending radially beyond the bellows, being polygonal in cross-sectional configuration, and having a peripheral contact surface of substantial height; and the other end of said spring having a polygonal head of smaller size, and with peripheral contact surface of substantial height to interfit with the enlarged heads of adjacent inverted springs.

2. The spring in claim 1 wherein said spring is tapered between a larger diameter at said one end to a smaller diameter at said other end.

3. A bellows spring support assembly, comprising: support means; a plurality of resilient bellows springs supported on said support means; each of said springs being a hollow, vented stack of interconnected compressible bellows; said springs being intermeshed with each other to produce a multiple effect resiliency characteristic; each of said springs including an axial portion defining a peripheral locator surface extending a substantial amount in a dimension generally parallel to the spring axis; and the locator surfaces of said several springs being positioned closely adjacent the locator surfaces of surrounding springs to achieve a predetermined spring pattern with exactly controlled resiliency.

4. The assembly in claim 3 wherein said axial portions on some springs are larger than on other springs to produce controlled, zonally varied effects.

5. The assembly in claim 3 wherein said axial portions on some springs are off-set with respect to the respective spring axes to produce controlled, zonally varied effects.

References Cited by the Examiner

UNITED STATES PATENTS

| | | | |
|---|---|---|---|
| 1,648,951 | 11/1927 | Knepper | 5—353 |
| 2,150,747 | 3/1939 | Naulty | 5—348 |
| 2,433,012 | 12/1947 | Zalicovitz | 5—351 |
| 2,878,012 | 3/1959 | Crites | 5—353 |
| 2,897,520 | 8/1959 | Bradford | 5—348 |
| 2,979,739 | 4/1961 | Krakauer | 5—345 |
| 3,201,111 | 8/1965 | Afton | 267—1 |

OTHER REFERENCES

German printed application, Schneider, 1,148,718, 5/1963.

FRANCIS K. ZUGEL, *Primary Examiner.*

FRANK B. SHERRY, *Examiner.*

C. A. NUNBERG, *Assistant Examiner.*